Nov. 3, 1953 — T. B. McCARTY — 2,657,739
BASIC STRUCTURE FOR AUXILIARY SEATS OR THE LIKE
Filed Dec. 12, 1949
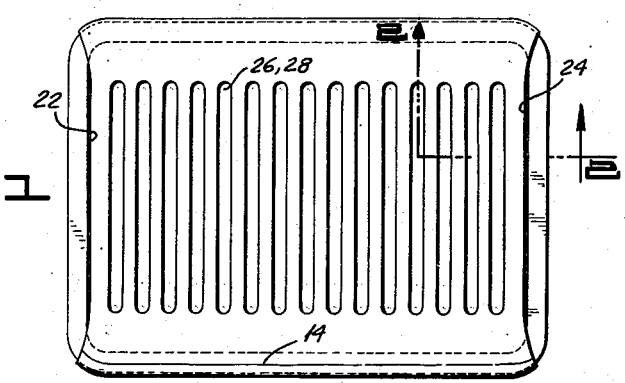
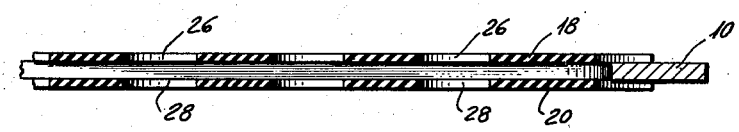
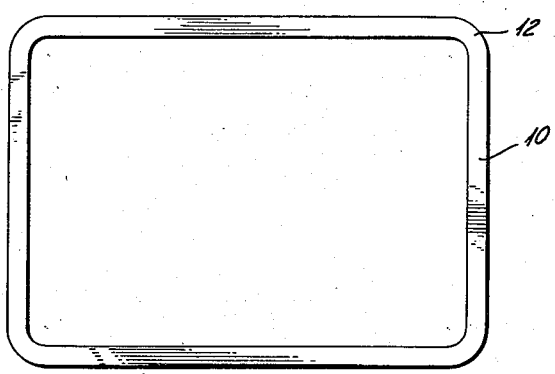
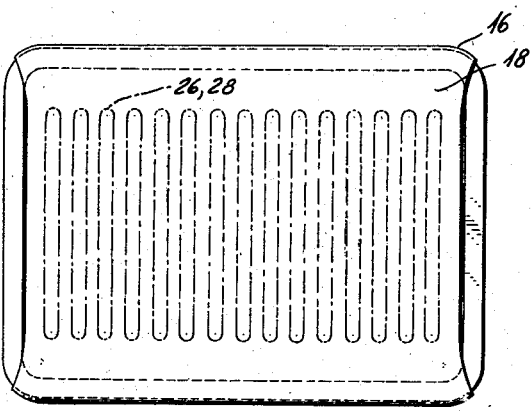
Inventor
THAD B. McCARTY
By Naylor and Lassagne
Attorneys Patented Nov. 3, 1953

2,657,739

UNITED STATES PATENT OFFICE 2,657,739

BASIC STRUCTURE FOR AUXILIARY SEATS OR THE LIKE

Thad B. McCarty, Oakland, Calif.

Application December 12, 1949, Serial No. 132,490

1 Claim. (Cl. 155—179)

This invention relates to seat construction, and more particularly to a basic supporting structure adapted to be comprised in an auxiliary seat, or like support for the human body.

It is a well known and frequent occurrence that upholstered seats, such as in automobiles or other vehicles, tend to become broken down or permanently depressed after extensive use, with the result that the occupant cannot readily maintain a proper posture. Such impairment of posture over an extended period of time may well lead to physical discomfort, which may possibly be permanent in nature, or at least be productive of temporary ills, such as backaches. The principal object of the present invention is to provide an improved basic structure for an auxiliary seat which may be superimposed on an upholstered seat to more efficiently distribute the occupant's weight between the auxiliary seat and the upholstered seat so as to prevent undue settling of the occupant's body in the upholstered seat and the consequent producing of incorrect posture and its accompanying physical discomfort.

A known variety of the auxiliary seat of the type above mentioned has comprised a rectangular metal frame over which a plurality of spaced rubber bands have been placed in stretched or taut condition. Transversely arranged sets of rubber bands have been used in this manner, with one set giving a supporting re-inforcement to the set which is transversely arranged thereto. This conventional arrangement requires much time and labor to assemble the structure, since the rubber bands must be individually arranged on the frame and properly aligned and spaced thereon. Also, the re-active action of any one of the rubber bands upon the imposition thereon of a weight is completely independent with respect to the other rubber bands. Furthermore, it is not practical or feasible to utilize the rubber bands as a protective and cushioning cover for the corners or rounded edges of the frame, with the result that a separate protective covering must be used for this purpose, or else the occupant is subjected to some discomfort and the fabric cover for the basic seat structure is subjected to greater wear.

In summary, the seat construction of the present invention departs from this conventional structural arrangement in that it comprises a single rubber member in stretched relation on a metal frame. The rubber member, which originally is in the form of a rubber sheet, is wrapped transversely around the frame, and the edges of the member are thereupon vulcanized together to secure the member to the frame as a taut, flattened sleeve. A plurality of spaced coincident slots are then stamped through the major planar portions of the rubber member within the confines of the frame, or the slot formation operation may be carried out before the rubber member is applied to the frame.

Other objects and advantages of the invention will be apparent from the following description taken in conjunction with the drawing forming a part of this specification, and in which:

Figure 1 is a plan view of the seat structure;

Figure 2 is a fragmentary sectional view taken along lines 2—2 of Figure 1;

Figure 3 is a plan view of the rectangular frame utilized in the basic seat structures; and Figure 4 is a plan view showing the seat structure before the slotting operation, with the slots being shown in dotted outline.

Referring to the drawing for more specific details of the invention, the seat structure comprises a rectangular frame 10, preferably made of metal, provided with rounded corners 12. A sheet of resilient material, such as rubber, is stretched around the frame, as shown in Figure 4, and the ends thereof are vulcanized together, or otherwise heat welded, as indicated at 14, to form the flattened sleeve 16 comprised of upper and lower planar portions 18 and 20 within the margins of the frame 10. It will be noted that when the rubber member has been secured in place, the outer ends of the edges thereof envelop substantial portions of the rounded corners 12 of the frame, while the transverse edges 22 and 24 of the rubber element are located within the margins of the frame. Thus, the full potential resiliency of the planar portions 18 and 20 of the rubber member is utilized, while, at the same time, the rubber covering for the corners 12 serves to reduce the wear which might otherwise be imparted to a suitable fabric covering which may enclose the basic seat structure comprising the frame and rubber member. It will also be obvious that the rubber sleeve member in conforming partially to the rounded corner contour of the frame will effectively frictionally anchor itself to a further degree against any tendency toward creeping movement with respect to the frame under heavy usage.

When the rubber sleeve member has been secured in place in the manner described, it is then put through a stamping operation to form the coincident sets of spaced slots 26 and 28, respectively, in planar portions 18 and 20, so as to impart the desired characteristic of resiliency to the seat structure and to enable it to be best used to most efficiently distribute the weight of the occupant over the planar portions 18 and 20, and to enable the seat structure, when it is imposed upon an upholstered seat, such as a vehicle seat, to partially support the weight of the occupant, while allowing the vehicle seat proper to support the balance of the weight. In this manner the occupant's weight is so distributed as to prevent his body from sinking to any great extent into a depression which has already been formed by usage in the seat, or, in the event that no such depression has as yet been developed in the upholstered seat, to so distribute the occupant's weight with respect to the upholstered seat as to prevent the formation through continued use of any permanent depression in the seat.

Since the rubber member is unitary in nature, as distinguished from the plurality of rubber bands that have previously been used in seat structures of this general type, it will be seen that there is no possibility, in a practical sense, for the bands defined by the slots 26 and 28 to vary their relative position with respect to either of the pairs of opposed sides of the frame 10, and thus the slots 26 and 28 cannot get out of alignment. The original resiliency characteristics of the seat structure are thus preserved against variance during use. It will also be obvious that accentuated tensioning of any of the bands defined by the slots 26 and 28, as by occupancy of the seat, will have an inter-dependent effect on adjacent bands, since all of the bands are a part of a unitary resilient element.

While the preferred embodiment of the seat structure of the invention has been shown and described, the invention is subject to changes and modifications within the spirit of the invention and the scope of the appended claim.

What I claim is new and desire to secure by Letters Patent is:

A support comprising a rigid rectangular frame provided with four rounded corners, a unitary sheet of rubber stretched transversely around said member and having the ends thereof secured together, said rubber sheet being of sufficient width in relation to the corresponding dimension of the frame and being sufficiently taut so that said sheet envelops and conforms to the end edges and a substantial portion of each of the rounded corners of said frame while the side edges of said rubber sheet are located within the margins of the sides of the frame adjacent to said side edges, and a plurality of spaced elongate slots formed in the two major planar portions of said resilient member within the space defined by said frame member.

THAD B. McCARTY.

References Cited in the file of this patent

UNITED STATES PATENTS

| Number | Name | Date |
| --- | --- | --- |
| 2,127,710 | Baker | Aug. 23, 1938 |
| 2,158,225 | Elmore | May 16, 1939 |
| 2,251,318 | Blair et al. | Aug. 5, 1941 |
| 2,272,885 | Rathbun | Feb. 10, 1942 |

FOREIGN PATENTS

| Number | Country | Date |
| --- | --- | --- |
| 105,007 | Australia | Sept. 15, 1938 |
| 252,638 | Great Britain | June 3, 1926 |